(12) United States Patent
Bhardwaj et al.

(10) Patent No.: US 9,027,595 B2
(45) Date of Patent: May 12, 2015

(54) TRANSPARENT FLUID RECIRCULATION RESERVOIR SYSTEM

(76) Inventors: Avinash Girish Bhardwaj, Ellington, CT (US); Glrish Krishnan, Ellington, CT (US)

( * ) Notice: Subject to any disclaimer, the term of this patent is extended or adjusted under 35 U.S.C. 154(b) by 1085 days.

(21) Appl. No.: 12/817,803

(22) Filed: Jun. 17, 2010

(65) Prior Publication Data

US 2011/0311209 A1    Dec. 22, 2011

(51) Int. Cl.
*F24H 1/20* (2006.01)
*F24D 19/10* (2006.01)
*F24D 17/00* (2006.01)
*F24D 17/02* (2006.01)

(52) U.S. Cl.
CPC ........ *F24D 19/1051* (2013.01); *F24D 17/0031* (2013.01); *F24D 17/0078* (2013.01); *F24D 17/02* (2013.01); *Y02B 10/30* (2013.01)

(58) Field of Classification Search
CPC ......... F01K 13/00; F16K 13/10; F16K 11/24; F16K 37/00; F24H 1/20; F24H 1/22; F24H 1/00; F24J 3/02; F24J 2/12
USPC ................. 137/559, 563, 564, 571, 572, 468; 237/8 R, 8 A, 7 B, 7 C, 8 D, 59; 220/567.3, 592.27, 592.28; 126/640, 126/362.1; 236/20 R, 12.11, 12.12
See application file for complete search history.

(56) References Cited

U.S. PATENT DOCUMENTS

| | | | | |
|---|---|---|---|---|
| 2,277,311 A | * | 3/1942 | Freeman | 126/640 |
| 2,519,281 A | * | 8/1950 | Presser et al. | 126/583 |
| 3,705,574 A | | 12/1972 | Duncan | |
| 3,958,555 A | * | 5/1976 | Horne | 237/8 A |
| 4,129,177 A | * | 12/1978 | Adcock | 237/1 R |
| 4,200,783 A | | 4/1980 | Ehret | |
| 4,403,602 A | * | 9/1983 | Warden | 126/640 |
| 4,552,125 A | * | 11/1985 | Borodulin et al. | 126/640 |
| 4,671,459 A | | 6/1987 | Stapensea | |
| 4,674,478 A | * | 6/1987 | Liebard | 126/653 |
| 4,750,472 A | * | 6/1988 | Fazekas | 237/8 A |
| 4,844,927 A | | 7/1989 | Morris, II | |
| 4,846,967 A | | 7/1989 | McGehee | |
| 4,945,943 A | * | 8/1990 | Cogger | 236/12.12 |
| 4,973,482 A | | 11/1990 | Morris, II | |

(Continued)

FOREIGN PATENT DOCUMENTS

| CN | 1963338 A | * | 5/2007 |
|---|---|---|---|
| JP | 2002209745 A | * | 7/2002 |

*Primary Examiner* — Craig Schneider
*Assistant Examiner* — Daniel Donegan

(57) ABSTRACT

A method for channeling hot/warm working fluid includes coupling a first fluid supply path in flow communication with an inlet of a first transparent fluid reservoir to a fluid inlet valve, coupling an outlet of the first transparent fluid reservoir in flow communication to a fluid outlet supply path, coupling a second fluid reservoir in flow communication with the first transparent fluid reservoir, and coupling a second fluid supply path in flow communication with an outlet of the second fluid reservoir to a fluid outlet valve. The method also includes directing working fluid of a temperature that is above a minimum threshold temperature from the fluid inlet valve to the fluid outlet supply path through the first transparent fluid reservoir, and directing working fluid of a temperature that is below the minimum threshold temperature from the first transparent fluid reservoir to the fluid outlet valve through the second fluid reservoir.

18 Claims, 2 Drawing Sheets

(56) References Cited

U.S. PATENT DOCUMENTS

| | | | |
|---|---|---|---|
| 5,168,793 A * | 12/1992 | Padamsee | 220/592.21 |
| 5,203,367 A * | 4/1993 | Akai et al. | 137/563 |
| 5,437,002 A * | 7/1995 | Bennett | 392/441 |
| 5,524,820 A | 6/1996 | Regan | |
| 5,626,287 A * | 5/1997 | Krause et al. | 236/20 R |
| 5,819,773 A * | 10/1998 | Kronowitt | 137/559 |
| 7,055,466 B2 | 6/2006 | Long | |
| 7,460,769 B2 | 12/2008 | Ryks | |
| 2003/0070430 A1* | 4/2003 | Beckius et al. | 60/645 |
| 2004/0079749 A1* | 4/2004 | Young et al. | 219/486 |
| 2008/0152331 A1 | 6/2008 | Ryks | |
| 2009/0165552 A1* | 7/2009 | Sieh et al. | 73/304 C |

* cited by examiner

TRANSPARENT FLUID RECIRCULATION RESERVOIR SYSTEM

FIELD OF THE INVENTION

This invention relates generally to a household/industrial water heater unit, and more particularly, to methods and apparatus for continuously monitoring a level and flow of hot/warm water in a transparent fluid reservoir of a heater unit.

BACKGROUND OF THE INVENTION

Most consumers waste a tremendous amount of water because of its plentifulness and low costs. Traditional water heaters that are installed in household basements and industrial facilities are used to heat an incoming stream of ambient temperature water from a water supply line. Once heated to a desired temperature, the water is channeled to a water storage reservoir. From the water storage reservoir, the hot water is channeled through supply lines and distributed to various facility locations where hot water is required, and discharged therein. Consequently the consumer is unaware of the quantity of hot water that is being consumed for performing his daily activities such as making hot beverages, showering, dishwashing, laundry, Etc. However, changing trends in the horizon indicate that this type of reckless consumer behavior cannot be sustained indefinitely due to the finite volume of clean water resources that are available to us in our environment. Consequently, there exists a need for a metering device that would enable consumers to monitor the volume of hot water that is being consumed on a real time basis, and consequently help induce them in reducing their levels of water consumption.

The need has existed for many years, yet there is no fully satisfactory system to meet the need. In accord with a long recognized need, there has been developed a transparent fluid recirculation reservoir system especially designed for use in industrial/household applications to satisfy many warm and hot water needs. The system itself is compact and easily transportable to various consumer locations. The heating element used in the system may be coupled to any renewable energy source such as solar power, wind turbine generator, electrical energy source, Etc. It is a versatile system in that it can be used to supply hot/warm water as the need dictates. Importantly, the transparent fluid recirculation reservoir system is efficient in operation.

BRIEF DESCRIPTION OF THE INVENTION

In one aspect, a method is provided for channeling a hot working fluid to a fluid outlet supply path using a transparent fluid recirculation reservoir system. The method comprises coupling a first fluid supply path in flow communication to a fluid inlet valve, coupling an inlet of a first transparent fluid reservoir in flow communication to the first fluid supply path, coupling an outlet of the first transparent fluid reservoir in flow communication to the fluid outlet supply path via a fluid mixer, coupling a second fluid reservoir in flow communication with the first transparent fluid reservoir, coupling a second fluid supply path in flow communication with an outlet of the second fluid reservoir to a fluid outlet valve. The method also comprises directing working fluid of a temperature that is above a minimum threshold temperature from the fluid inlet valve to the fluid outlet supply path through the first fluid supply path and the first transparent fluid reservoir, and directing working fluid of a temperature that is below the minimum threshold temperature from the first transparent fluid reservoir to the fluid outlet valve through the second fluid reservoir and the second fluid supply path.

In another aspect of the invention, a transparent fluid recirculation reservoir system for supplying hot/warm working fluid to a fluid outlet supply path is provided. The transparent fluid recirculation reservoir system includes a first fluid supply path configured to be coupled in flow communication to a fluid inlet valve, and a first transparent fluid reservoir coupled in flow communication to the first fluid supply path. A second fluid reservoir is coupled in flow communication with the first transparent fluid reservoir and configured to receive fluid discharged from the first transparent fluid reservoir. The transparent fluid recirculation reservoir system includes a second fluid supply path configured to be coupled in flow communication to a fluid outlet valve, and an outlet of the second fluid reservoir coupled in flow communication to the second fluid supply path. A fluid outlet supply path is configured to be coupled in flow communication to a fluid mixer, and an outlet of the first transparent fluid reservoir coupled in flow communication to the fluid outlet supply path.

In a further aspect, a household/industrial water heater unit for continuously monitoring the level and flow of hot/warm working fluid such as hot/warm water in a transparent fluid reservoir is provided. The water heater unit includes a water heater that is coupled in flow communication to a source of ambient temperature water via an adjustable flow cock. The water heater includes an outlet that is coupled in flow communication to a condenser via a flow pump. A first fluid supply path is configured to be coupled in flow communication to the condenser, and a first transparent fluid reservoir coupled in flow communication to the first fluid supply path via a fluid inlet valve. A second fluid reservoir is coupled in flow communication with the first transparent fluid reservoir and is configured to receive water discharged from the first transparent fluid reservoir. A second fluid supply path is configured to be coupled in flow communication to the condenser, and an outlet of the second fluid reservoir coupled in flow communication to the second fluid supply path via a fluid outlet valve. The first transparent fluid reservoir is also coupled to a fluid outlet supply path via a fluid mixer for discharging hot/warm water from the first transparent fluid reservoir to the fluid outlet supply path.

DETAILED DESCRIPTION OF THE INVENTION

Figure 1:
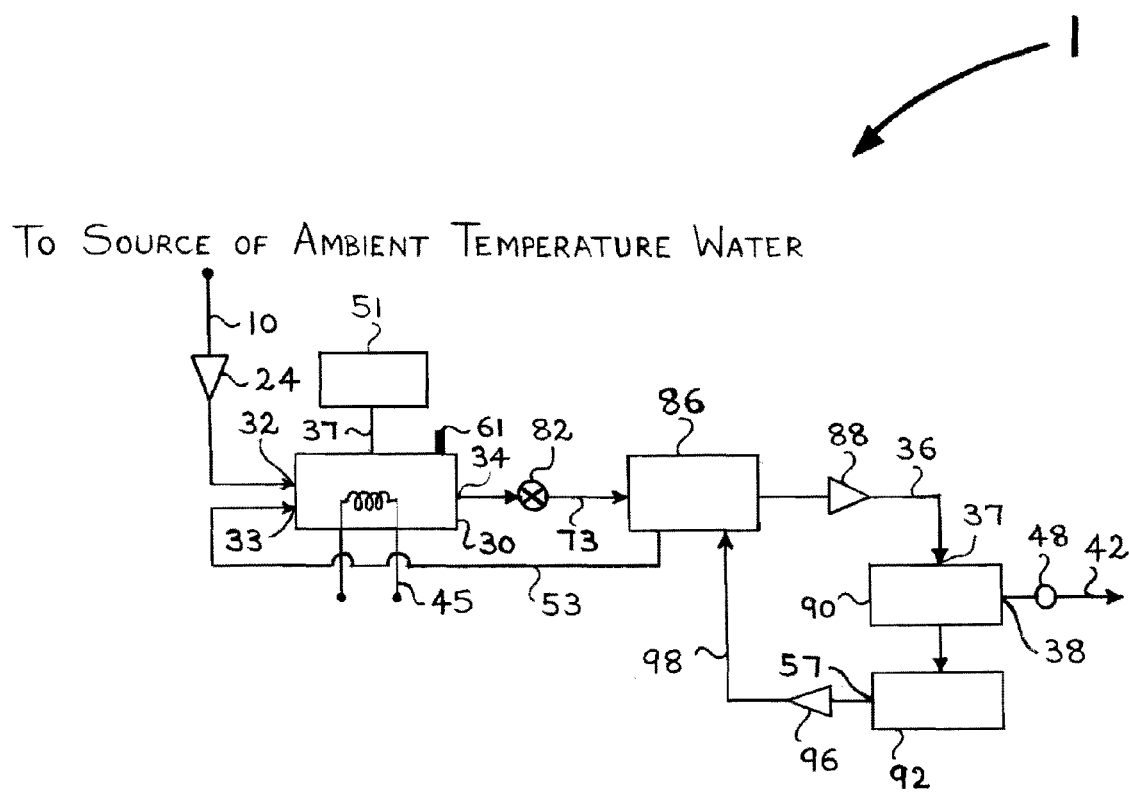
FIG. 1 is a block diagram of a household/industrial water heater unit.

FIG. 1 is a block diagram of a household/industrial water heater unit 1 used to supply a hot/warm working fluid such as hot/warm water to a fluid outlet supply path 42. More specifically, in the exemplary embodiment, the household/industrial water heater unit 1 is coupled to a source of ambient temperature water (not shown) through a fluid inlet passageway 10, and is therefore used to supply hot/warm water to the fluid outlet supply path 42.

The household/industrial water heater unit 1 includes an adjustable flow cock 24. In the exemplary embodiment, adjustable flow cock 24 may be actuated by a manual/automated control mechanism for controlling the flow rate of ambient temperature water from the source of ambient temperature water to a heater 30. More specifically, the fluid inlet passageway 10 is coupled to the adjustable flow cock 24 for channeling water flow from the source of ambient temperature water to the heater 30. In the exemplary embodiment, water inlet passageway 10 is formed from a suitable piping material for channeling ambient temperature water from the source of ambient temperature water to the heater 30.

In the exemplary embodiment, heater 30 includes a plurality of inlet ports, a heating chamber, an outlet port 34, and a heating element 45. In the exemplary embodiment, heater 30 includes two inlet ports, 32 and 33. More specifically, in the exemplary embodiment, the two inlet ports, 32 and 33 of heater 30 are coupled to heater inlet valves (not shown) for selectively opening the inlet ports, 32 and 33 of heater 30 to facilitate channeling water to the heating chamber. Heater 30 is coupled to the fluid inlet passageway 10 via a first inlet port 32. Heater 30 includes a temperature control mechanism 61 and is configured to control the temperature of water that is channeled into the heating chamber of heater 30 via the plurality of inlet ports, 32 and 33 to a user selected outlet temperature. The heating element 45 of the heater 30 may be coupled to various conventional and non-conventional energy sources such as solar power, wind turbine generator, electric power, Etc. to heat water that is channeled into the heating chamber of heater 30 via the plurality of inlet ports, 32 and 33. A timer 51 coupled to the heater 30 via control flow path 37 may be configured to accept an input by a water heater user to turn on the heater 30 at a specific time defined by the user. More specifically, timer 51 may be configured to automatically turn on the heater 30 at multiple times during a day as defined by the user and automatically turn off after a predetermined interval of time of the heater operation has elapsed.

A fluid outlet passageway 73 channels hot water at the user selected outlet temperature from the outlet port 34 of heater 30 to a first inlet of condenser 86. More specifically, water outlet passageway 73 is coupled to a flow pump 82 to channel water at the user selected outlet temperature from the outlet port 34 of heater 30 to the first inlet of condenser 86. Flow pump 82 is configured to increase the pressure and therefore control the flow of hot water supplied through fluid outlet passageway 73 to the first inlet of condenser 86. In the exemplary embodiment, flow pump 82 is a manual/automated flow rate adjustable pump that is configured to control the flow rate of water from the outlet port 34 of the heater 30 to the first inlet of condenser 86.

In the exemplary embodiment, the first inlet of condenser 86 is configured to receive hot water at the user selected outlet temperature from the heater 30 via the flow pump 82. The steam that is mixed with the hot water from the heater 30 is condensed in the condenser 86 prior to the hot water being discharged through a first fluid supply path 36 that is coupled to a first outlet of condenser 86. More specifically, the latent heat of vaporization that is generated by the condensed steam is absorbed in the condenser 86 such that mostly hot water containing a small proportion of steam is discharged from the first outlet of condenser 86.

The household/industrial water heater unit 1 includes a fluid inlet valve 88. In the exemplary embodiment, fluid inlet valve 88 may be actuated by a manual/automated mechanism for controlling the flow rate of hot water discharged from the first outlet of condenser 86 to a first transparent fluid reservoir 90. More specifically, the first fluid supply path 36 is coupled to fluid inlet valve 88 for channeling water flow from the first outlet of condenser 86 to the first transparent fluid reservoir 90. In the exemplary embodiment, the first fluid supply path 36 is formed from a suitable piping material for channeling hot water from the first outlet of condenser 86 to the first transparent fluid reservoir 90.

In the exemplary embodiment, the first transparent fluid reservoir 90 includes an inlet port 37, a graduated transparent storage chamber, and a plurality of outlet ports. In the exemplary embodiment the first transparent fluid reservoir 90 includes two outlet ports. The first transparent fluid reservoir 90 is coupled to the first fluid supply path 36 through the reservoir inlet port 37, and is configured to receive hot water discharged from the first outlet of condenser 86 through the first fluid supply path 36. First transparent fluid reservoir 90 includes a temperature transducer system (not shown) that is configured to determine if a temperature of water present in the graduated transparent storage chamber of the first transparent fluid reservoir 90 is below a minimum threshold temperature.

A fluid outlet supply path 42 includes an upstream end and a downstream end. An upstream end of the fluid outlet supply path 42 is coupled to a first outlet port 38 of the first transparent fluid reservoir 90, and is configured to channel hot/warm water of a temperature that is above a minimum threshold temperature from the first transparent fluid reservoir 90 to the downstream end of the fluid outlet supply path 42. More specifically, fluid outlet supply path 42 is coupled to a fluid mixer 48 and is configured to channel hot/warm water of a temperature that is above a minimum threshold temperature from the first outlet port 38 of the first transparent fluid reservoir 90 to the downstream end of the fluid outlet supply path 42. Fluid mixer 48 is configured to mix hot/warm water channeled from the first outlet port 38 of the first transparent fluid reservoir 90 with ambient temperature water from a water inlet supply line (not shown) to a user defined outlet temperature. In the exemplary embodiment, fluid mixer 48 is a manual/automated fluid mixer that is configured to mix hot/warm water of a temperature that is above a minimum threshold temperature with ambient temperature water in appropriate proportions to a user defined outlet temperature, and channel water at the user defined outlet temperature to the downstream end of the fluid outlet supply path 42.

The household/industrial water heater unit 1 includes a second fluid reservoir 92 that includes an inlet port and a plurality of outlet ports. In the exemplary embodiment, second fluid reservoir 92 includes two outlet ports. In the exemplary embodiment, the second fluid reservoir 92 is coupled in flow communication with the first transparent fluid reservoir 90 and is configured to receive water of a temperature that is below the minimum threshold temperature discharged from the first transparent fluid reservoir 90. The water that is discharged from the first transparent fluid reservoir 90 to the second fluid reservoir 92 is recirculated to a second inlet of the condenser 86 through a second fluid supply path 98 that is coupled to a first outlet port 57 of the second fluid reservoir 92.

The household/industrial water heater unit 1 includes a fluid outlet valve 96. In the exemplary embodiment, fluid outlet valve 96 may be actuated by a manual/automated mechanism for controlling the flow of water recirculated from the first outlet port 57 of the second fluid reservoir 92 to the second inlet of condenser 86. More specifically, the second fluid supply path 98 is coupled to fluid outlet valve 96 for channeling water flow from the first outlet port 57 of the second fluid reservoir 92 to the second inlet of condenser 86. In the exemplary embodiment, the second fluid supply path 98 is formed from a suitable piping material for channeling water flow from the second fluid reservoir 92 to the second inlet of condenser 86.

In the exemplary embodiment, the second inlet of condenser 86 is configured to receive water discharged from the first outlet port 57 of the second fluid reservoir 92. The latent heat of vaporization of condensed steam that is absorbed in the condenser 86 from the incoming stream of hot water/steam at the user selected outlet temperature from heater 30 is used to heat the water recirculated from the second fluid reservoir 92 to the second inlet of condenser 86 through the second fluid supply path 98. The water that is heated in the condenser 86 by the incoming stream of hot water/steam at the user selected outlet temperature is then recirculated to the heating chamber of heater 30 through a fluid recirculation path 53. More specifically, in the exemplary embodiment, an upstream end of fluid recirculation path 53 is coupled in flow communication to a second outlet of condenser 86, and a downstream end of fluid recirculation path 53 is coupled in flow communication to the second inlet port 33 of heater 30. In the exemplary embodiment, fluid recirculation path 53 is configured to recirculate water that is heated in the condenser 86 by the incoming stream of hot water/steam at the user selected outlet temperature to the second inlet port 33 of heater 30.

Figure 2:
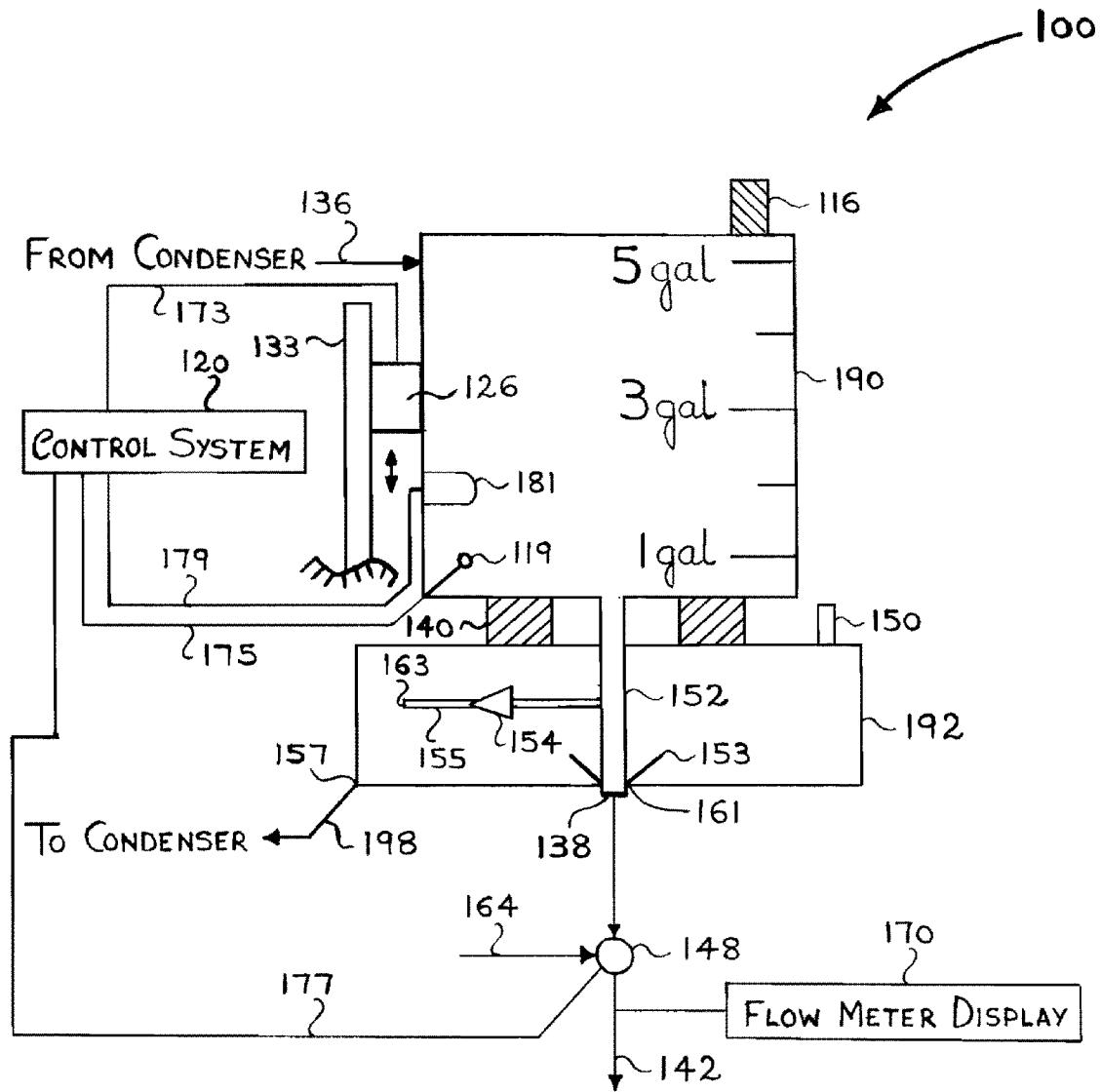
FIG. 2 is a schematic representation of a transparent fluid recirculation reservoir system used with the household/industrial water heater unit shown in FIG. 1.

FIG. 2 is a schematic representation of a transparent fluid recirculation reservoir system 100. In an exemplary embodiment, transparent fluid recirculation reservoir system 100 is coupled to a first outlet of condenser 86 through a first fluid supply path 136, and is configured to supply warm/hot water to a fluid outlet supply path 142.

The transparent fluid recirculation reservoir system 100 includes a first transparent fluid reservoir 190. In the exemplary embodiment, first transparent fluid reservoir 190 includes a graduated transparent storage chamber for receiving hot water/steam from the first fluid supply path 136. First transparent fluid reservoir 190 includes a pressure release valve 116 coupled to an upper portion of the first transparent fluid reservoir 190 and is in flow communication with the graduated transparent storage chamber of the first transparent fluid reservoir 190. Pressure release valve 116 is configured to release excess pressure built up by the water/steam beyond the normal design operating pressure limit of the first transparent fluid reservoir 190. First transparent fluid reservoir 190 includes a temperature transducer 119 such as a thermocouple coupled within the graduated transparent storage chamber of first transparent fluid reservoir 190 and is configured to measure a temperature of water in the first transparent fluid reservoir 190. In the exemplary embodiment, first transparent fluid reservoir 190 includes a fluid level indicator transducer 181 coupled within the graduated transparent storage chamber of first transparent fluid reservoir 190 and is configured to measure a level of water in the first transparent fluid reservoir 190. More specifically, in the exemplary embodiment, temperature transducer 119 and fluid level indicator transducer 181 may be independently and modularly coupled to the first transparent fluid reservoir 190. In the exemplary embodiment, first transparent fluid reservoir 190 includes a first fluid outlet passageway 152 for channeling hot/warm water of a temperature that is above a minimum threshold temperature from the graduated transparent storage chamber of the first transparent fluid reservoir 190 to the fluid outlet supply path 142. More specifically, in the exemplary embodiment an area of cross-section of the first fluid outlet passageway 152 is smaller than an area of cross-section of the graduated transparent storage chamber of the first transparent fluid reservoir 190 to facilitate channeling hot/warm water of a temperature that is above a minimum threshold temperature to the fluid outlet supply path 142 at a user desired flow rate. In the exemplary embodiment, a second fluid outlet passageway 155 is coupled in flow communication to the first fluid outlet passageway 152 of first transparent fluid reservoir 190 via a fluid discharge valve 154 for channeling water of a temperature that is below the minimum threshold temperature to a second fluid reservoir 192.

In an exemplary embodiment, first transparent fluid reservoir 190 is configured to minimize heat losses due to conduction, convection, and radiation effects. More specifically, first transparent fluid reservoir 190 is formed from a double walled construction. The spacing between the two walls of the double walled construction of the first transparent fluid reservoir 190 includes a vacuum-gap to minimize heat losses due to convection. Moreover, the first transparent fluid reservoir 190 itself is constructed from a synthetic resin, plastic material, and any other suitable material that would minimize heat losses from the first transparent fluid reservoir 190 due to conduction. In an exemplary embodiment, the first transparent fluid reservoir 190 may have silvered internal surfaces on all sides excluding a narrow display panel portion of transparency that extends from an upper end of the first transparent fluid reservoir 190 to a lower end of the first transparent fluid reservoir 190 to minimize heat losses due to radiation. The narrow display panel portion of transparency is provided for a user to continuously monitor a level and flow of hot/warm water that is channeled from the first transparent fluid reservoir 190 through the fluid outlet supply path 142. In a further exemplary embodiment, the first transparent fluid reservoir 190 is coupled to a support cage (not shown) to prevent any transverse movement of the first transparent fluid reservoir 190.

A fluid outlet supply path 142 includes an upstream end and a downstream end. An upstream end of the fluid outlet supply path 142 is coupled substantially vertically below and to a first outlet port 138 of the first transparent fluid reservoir 190, and is configured to channel hot/warm water of a temperature that is above a minimum threshold temperature from the first transparent fluid reservoir 190 to the downstream end of the fluid outlet supply path 142. More specifically, in the exemplary embodiment, fluid outlet supply path 142 is coupled to a fluid mixer 148 to gravity drain hot/warm water of a temperature that is above the minimum threshold temperature from the first outlet port 138 of the first transparent fluid reservoir 190 to the downstream end of the fluid outlet supply path 142. Fluid mixer 148 is configured to mix hot/warm water channeled from the first outlet port 138 of the first transparent fluid reservoir 190 with ambient temperature water from a water inlet supply line 164 to a user defined outlet temperature. In the exemplary embodiment, fluid mixer 148 is a manual/automated pressurized fluid mixer that is configured to mix hot/warm water of a temperature that is above a minimum threshold temperature with ambient temperature water from the water inlet supply line 164 in appropriate proportions to a user defined outlet temperature, and channeling pressurized water at the user defined outlet temperature to the downstream end of the fluid outlet supply path 142. A flow meter display 170 is coupled downstream from the fluid mixer 148 to the fluid outlet supply path 142 and is configured to digitally display the total volume of water consumed at the downstream end of the fluid outlet supply path 142.

In an exemplary embodiment, the downstream end of the fluid outlet supply path 142 is coupled to an inlet of a third transparent fluid reservoir (not shown), and is configured to discharge a definite volume of water at the user defined outlet temperature from the first transparent fluid reservoir 190 to the third transparent fluid reservoir. An outlet of the third transparent fluid reservoir may be coupled to a fluid outlet device such as a shower faucet (not shown). In an alternate embodiment, the downstream end of the fluid outlet supply path 142 is coupled to a fluid outlet device such as a shower faucet (not shown).

The transparent fluid recirculation reservoir system 100 includes a second fluid reservoir 192 that includes an inlet port and a plurality of outlet ports. In an exemplary embodiment, second fluid reservoir 192 includes two outlet ports, 157 and 161. In the exemplary embodiment, the second fluid reservoir 192 is coupled in flow communication with the first transparent fluid reservoir 190 and is configured to receive water of a temperature that is below the minimum threshold temperature discharged from the first transparent fluid reservoir 190. In the exemplary embodiment, the second fluid reservoir 192 is coupled substantially vertically below the first transparent fluid reservoir 190 and is configured to gravity drain water of a temperature that is below the minimum threshold temperature discharged from the first transparent fluid reservoir 190. The water that is discharged from the first transparent fluid reservoir 190 to the second fluid reservoir 192 is recirculated to a second inlet of condenser 86 through a second fluid supply path 198 that is coupled to a first outlet port 157 of the second fluid reservoir 192.

In the exemplary embodiment, the second fluid reservoir 192 includes a second outlet port 161. The second outlet port 161 of the second fluid reservoir 192 includes a spring actuated check valve 153 that is coupled in flow communication to the second outlet port 161. The spring actuated check valve 153 is coupled in flow communication with the second outlet port 161 of the second fluid reservoir 192 for controlling the flow of water from the second fluid reservoir 192 to the fluid outlet supply path 142. More specifically, the first fluid outlet passageway 152 of the first transparent fluid reservoir 190 is inserted through the second outlet port 161 of the second fluid reservoir 192 via the spring actuated check valve 153 to facilitate channeling warm/hot water of a temperature that is above the minimum threshold temperature from the first outlet port 138 of the first transparent fluid reservoir 190 to the fluid outlet supply path 142. In an exemplary embodiment, the second fluid reservoir 192 includes any type of valve mechanism 153 that allows for the first fluid outlet passageway 152 to be inserted through the second outlet port 161 to facilitate channeling warm/hot water of a temperature that is above the minimum threshold temperature from the first transparent fluid reservoir 190 to the fluid outlet supply path 142. In the exemplary embodiment, the second fluid reservoir 192 includes a plurality of stops 140 coupled to an upper surface of the second fluid reservoir 192 for preventing the first transparent fluid reservoir 190 from contacting the second fluid reservoir 192. In an alternate exemplary embodiment, first transparent fluid reservoir 190 includes a plurality of stops 140 coupled to a lower surface of the first transparent fluid reservoir 190 for preventing the first transparent fluid reservoir 190 from contacting the second fluid reservoir 192. In the exemplary embodiment, second fluid reservoir 192 includes an air-gap passageway 150 that is exposed to the atmosphere to facilitate smooth discharge of water from the first transparent fluid reservoir 190 to the second fluid reservoir 192 as will be discussed in detail below.

The transparent fluid recirculation reservoir system 100 includes a control system 120. The control system 120 is coupled to the temperature transducer 119 such as a thermocouple through a control path 175 for determining when the temperature of water in the first transparent fluid reservoir 190 is below a minimum threshold temperature. More specifically, the control system 120 is configured to receive an electrical signal that is indicative of a temperature of water in the first transparent fluid reservoir 190 from the temperature transducer 119, compare the received electrical temperature signal to a minimum threshold temperature signal, and hence determine if the temperature of water in the first transparent fluid reservoir 190 is lesser than the minimum threshold temperature. In an exemplary embodiment, the minimum threshold temperature is programmable at a control system terminal of the control system 120 by a user.

An actuator 126 is coupled to the first transparent fluid reservoir 190 for actuating the first transparent fluid reservoir 190. More specifically, an end face of actuator 126 is coupled to a fixed vertical support 133 using guide rails for facilitating smooth vertical movement of the actuator 126, while an opposite end face of actuator 126 is rigidly coupled to the first transparent fluid reservoir 190. In the exemplary embodiment, the control system 120 is coupled to the actuator 126 through a control path 173 for actuating the first transparent fluid reservoir 190 vertically upwards to a predetermined displacement to facilitate discharging water to the second fluid reservoir 192 through the first outlet port 138 of the first transparent fluid reservoir 190 when the temperature of water is lesser than the minimum threshold temperature. More specifically, the first fluid outlet passageway 152 of the first transparent fluid reservoir 190 is actuated vertically upwards to a predetermined displacement above the second outlet port 161 of the second fluid reservoir 192 for a predetermined programmable time interval to facilitate discharging all of the water from the first transparent fluid reservoir 190 to the second fluid reservoir 192 through the first outlet port 138. In the exemplary embodiment, spring actuated check valve 153 moves to a closed position thereby closing the second outlet port 161 of the second fluid reservoir 192 when the first transparent fluid reservoir 190 is actuated vertically upwards to a predetermined displacement, thereby preventing water that is discharged in the second fluid reservoir 192 from being channeled to the fluid outlet supply path 142. In an alternate embodiment, control system 120 is coupled to the fluid discharge valve 154 via a control path (not shown), and is configured to actuate the fluid discharge valve 154 to an open position to facilitate discharging all of the water from the first transparent fluid reservoir 190 to the second fluid reservoir 192. Specifically, the outlet valve 154 is actuated to an open position for a predetermined programmable time interval to facilitate discharging all of the water from the first transparent fluid reservoir 190 to the second fluid reservoir 192 through a second outlet port 163 in flow communication with the second fluid outlet passageway 155 when the temperature of water is lesser than the minimum threshold temperature. In a further alternate embodiment, control system 120 is configured to simultaneously actuate the outlet valve 154 to an open position and actuate the first transparent fluid reservoir 190 vertically upwards to a predetermined displacement to facilitate discharging all of the water from the first transparent fluid reservoir 190 to the second fluid reservoir 192 when the temperature of water is lesser than the minimum threshold temperature.

Control system 120 is further configured to be coupled to fluid mixer 148 through a control flow path 177. Fluid mixer 148 is configured to mix hot/warm water of a temperature that is above the minimum threshold temperature from the first transparent fluid reservoir 190 with ambient temperature water from a water inlet supply line 164. In an exemplary embodiment, control system 120 is configured to automatically mix hot/warm water from the first transparent fluid reservoir 190 with ambient temperature water from the water inlet supply line 164 to a user desired outlet water temperature. More specifically, in an exemplary embodiment, a user can manually program the control system 120 such that hot/ warm water from the first transparent fluid reservoir 190 is mixed with the appropriate proportion of ambient temperature water from the water inlet supply line 164, to generate a flow of water to the downstream end of the first fluid supply path 142 at a user desired outlet water temperature.

Control system 120 is further configured to be coupled to the fluid level indicator transducer 181 through a control flow path 179. Control system 120 is configured to determine the level of water in the first transparent fluid reservoir 190. In addition, control system 120 is coupled to flow pump 82 and fluid inlet valve 88 through control flow paths (not shown), and is configured to operate the flow pump 82 and actuate the fluid inlet valve 88 to an open position to facilitate channeling hot water to the first transparent fluid reservoir 190 from the first fluid supply path 136. In the exemplary embodiment, control system 120 is configured to facilitate channeling hot water to the graduated transparent storage chamber of the first transparent fluid reservoir 190 through the first fluid supply path 136 when the level of water in the first transparent fluid reservoir 190 decreases below a first threshold water level. In a further exemplary embodiment, the control system 120 is configured to turn off the operation of the flow pump 82 and actuate the fluid inlet valve 88 to a closed position to facilitate shutting off the supply of hot water to the graduated transparent storage chamber of the first transparent fluid reservoir 190 when the level of water in the first transparent fluid reservoir 190 increases above a second threshold water level. The fluid level indicator transducer 181 is any type of commercially available transducer device that operates on the principle described above. The first threshold water level and the second threshold water level may be manually programmable at a control system terminal of the control system 120 by a user. In a further exemplary embodiment, control system 120 is coupled to heater 30 via a control flow path (not shown), and is configured to turn on the heater 30 when the level of water in the first transparent fluid reservoir 190 decreases below the first threshold water level and turn off the operation of heater 30 when the level of water in the first transparent fluid reservoir 190 increases above the second threshold water level.

Control system 120 is further configured to be coupled to the fluid outlet valve 96 via a control flow path (not shown). In the exemplary embodiment, control system 120 is configured to actuate the fluid outlet valve 96 to an open position to facilitate channeling water from the second fluid reservoir 192 to the second inlet of condenser 86 when the first transparent fluid reservoir 190 is actuated vertically upwards to a predetermined displacement. More specifically, control system 120 is configured to actuate the fluid outlet valve 96 to an open position for a predetermined programmable time interval to facilitate channeling all of the water from the second fluid reservoir 192 to the second inlet of condenser 86 through a second fluid supply path 198. In a further exemplary embodiment, the control system 120 is configured to actuate the fluid outlet valve 96 to a closed position after the predetermined time interval has elapsed.

In operation, hot water is channeled from the first outlet of condenser 86 to the graduated transparent storage chamber of the first transparent fluid reservoir 90 through the first fluid supply path 36. If the water in the graduated transparent storage chamber of the first transparent fluid reservoir 90 is not consumed at the downstream end of the fluid outlet supply path 142, the temperature of water in the first transparent fluid reservoir 90 decreases. More specifically, when the temperature of water decreases below the minimum threshold temperature, the water in the first transparent fluid reservoir 90 is discharged to the second fluid reservoir 92. The water in the second fluid reservoir 92 is then recirculated to the second inlet of condenser 86 through the second fluid supply path 98. Water heated in the condenser 86 by the incoming stream of hot water/steam at the user selected outlet temperature is then recirculated through fluid recirculation path 53 to the second inlet port 33 of heater 30 to reheat the water to the user selected outlet temperature. The reheated water at the user selected outlet temperature from the heater 30 is channeled to the graduated transparent storage chamber of the first transparent fluid reservoir 90 through the flow pump 82, condenser 86 and the first fluid supply path 36. More specifically, water from the heater 30 is channeled to the graduated transparent storage chamber of the first transparent fluid reservoir 90 until the level of water in the graduated transparent storage chamber of the first transparent fluid reservoir 90 steadily increases above the second threshold water level.

As water in the first transparent fluid reservoir 90 that is above the minimum threshold temperature is consumed by a user at the downstream end of the fluid outlet supply path 42, the level of water in the graduated transparent storage chamber of the first transparent fluid reservoir 90 steadily decreases. As the level of water in the graduated transparent storage chamber of the first transparent fluid reservoir 90 decreases below the first threshold water level, hot water is channeled from the first fluid supply path 36 to the first transparent fluid reservoir 90 as water is continuously consumed at the downstream end of the fluid outlet supply path 42.

The above described transparent fluid recirculation reservoir system 100 is cost effective and highly reliable. The transparent fluid recirculation reservoir system 100 facilitates the hot/warm water level and flow in a transparent fluid reservoir 190 to be continuously monitored by a user as the water is being discharged to a fluid outlet supply path 142. Moreover, discharging water to the second fluid reservoir 192 from the first transparent fluid reservoir 190 by actuating the first transparent fluid reservoir 190 vertically upwards to a predetermined displacement and actuating the outlet valve 154 of the first transparent fluid reservoir 190 facilitates preventing water that is below the minimum threshold temperature from mixing with hot water that is channeled to the first transparent fluid reservoir 190 through the first fluid supply path 136. In addition, the modular nature of each sub-system of the household/industrial water heater unit 100 facilitates easy disassembly and replacement of individual system components as required.

Exemplary embodiments of a transparent fluid recirculation reservoir system are described above in detail. The systems are not limited to the specific embodiments described herein, but rather, components of each system may be utilized separately and independently from other components described herein.

While the invention has been described in terms of various specific embodiments, those skilled in the art will recognize that the invention can be practiced with modifications within the spirit and scope of the claims.

What is claimed is:

1. A transparent fluid reservoir system, said transparent fluid reservoir system comprising:
   a transparent fluid reservoir;
   a fluid outlet supply path comprising an upstream end and a downstream end, said upstream end in flow communication with an outlet of said transparent fluid reservoir for channeling fluid to said downstream end of said fluid outlet' supply path;

an automated mixer in flow communication with said fluid outlet supply path for mixing a first fluid with a second fluid and supplying mixed fluid from said automated mixer; and a control system coupled to said automated mixer, a fluid inlet valve coupled to said control system, said control system facilitates mixing the first fluid with the second fluid.

2. A transparent fluid reservoir system, said transparent fluid reservoir system comprising:

a first transparent fluid reservoir coupled in flow communication to a first fluid supply path;

a fluid outlet supply path comprising an upstream end and a downstream end, said upstream end coupled in flow communication to an outlet of said first transparent fluid reservoir for channeling fluid to said downstream end of said fluid outlet supply path;

an automated mixer coupled in flow communication to said fluid outlet supply path for mixing a first temperature fluid with a second temperature fluid to a user defined outlet temperature; and a control system coupled to said automated mixer, a fluid inlet valve coupled to said control system, said control system facilitates mixing the first temperature fluid with the second temperature fluid to the user defined outlet temperature.

3. A transparent fluid reservoir system in accordance with claim 2 wherein said control system is coupled to a temperature transducer, said temperature transducer coupled to said first transparent fluid reservoir for determining if a temperature of fluid is lesser than a minimum threshold temperature.

4. A transparent fluid reservoir system in accordance with claim 2 further comprising an actuator coupled to said first transparent fluid reservoir, said control system coupled to said actuator, said actuator configured to actuate said first transparent fluid reservoir to facilitate discharging fluid through said outlet of said first transparent fluid reservoir when a temperature of fluid is lesser than a minimum threshold temperature.

5. A transparent fluid reservoir system in accordance with claim 2 further comprising a pressure release valve coupled to said first transparent fluid reservoir.

6. A transparent fluid reservoir system in accordance with claim 2 wherein said first transparent fluid reservoir comprises a graduated transparent storage chamber.

7. A transparent fluid reservoir system in accordance with claim 2 wherein said fluid inlet valve is coupled in flow communication to said first fluid supply path.

8. A transparent fluid reservoir system in accordance with claim 2 wherein said control system is coupled to a heater.

9. A transparent fluid reservoir system in accordance with claim 2 wherein the first temperature fluid is at a temperature that is greater than or equal to a minimum threshold temperature.

10. A transparent fluid reservoir system in accordance with claim 2 wherein the second temperature fluid is at an ambient temperature.

11. A transparent fluid reservoir system in accordance with claim 2 further comprising a fluid level indicator transducer coupled to said control system.

12. A transparent fluid reservoir system in accordance with claim 11 wherein said fluid level indicator transducer is coupled to said first transparent fluid reservoir.

13. A transparent fluid reservoir system in accordance with claim 2 further comprising a second fluid reservoir coupled in flow communication with said first transparent fluid reservoir.

14. A transparent fluid reservoir system in accordance with claim 13 further comprising:

a second fluid supply path coupled in flow communication to an outlet of said second fluid reservoir; and a fluid outlet valve coupled in flow communication to said second fluid supply path for controlling fluid flow through said second fluid supply path.

15. A transparent fluid reservoir system in accordance with claim 13 wherein said second fluid reservoir coupled in flow communication with said first transparent fluid reservoir comprises said second fluid reservoir coupled in flow communication with said first transparent fluid reservoir through at least one of a fluid discharge valve and through said outlet of said first transparent fluid reservoir.

16. A transparent fluid reservoir system in accordance with claim 13 wherein said first transparent fluid reservoir is configured to discharge fluid of a temperature that is lesser than a minimum threshold temperature to said second fluid reservoir.

17. A transparent fluid reservoir system in accordance with claim 13 further comprising at least one stop coupled to one of said first transparent fluid reservoir and said second fluid reservoir for preventing said first transparent fluid reservoir from contacting said second fluid reservoir.

18. A transparent fluid reservoir system, said transparent fluid reservoir system comprising:

a transparent fluid reservoir;

a fluid outlet supply path comprising an upstream end and a downstream end, said upstream end in flow communication with an outlet of said transparent fluid reservoir for channeling fluid to said downstream end of said fluid outlet supply path;

an automated mixer in flow communication with said fluid outlet supply path for mixing a first temperature fluid with a second temperature fluid to a user defined outlet temperature; and a control system coupled to said automated mixer, a fluid inlet valve coupled to said control system, said control system facilitates mixing the first temperature fluid with the second temperature fluid to the user defined outlet temperature.

* * * * *